US009618737B2

(12) United States Patent
Khan et al.

(10) Patent No.: US 9,618,737 B2
(45) Date of Patent: Apr. 11, 2017

(54) COLOR SEQUENCE ILLUMINATION SYSTEM WITH PHOSPHOR LIGHT FILTER

(71) Applicant: Texas Instruments Incorporated, Dallas, TX (US)

(72) Inventors: Sajjad A. Khan, Plano, TX (US); Philip S. King, Allen, TX (US); Gregory S. Pettitt, Farmersville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 493 days.

(21) Appl. No.: 14/167,612

(22) Filed: Jan. 29, 2014

(65) Prior Publication Data

US 2014/0226306 A1 Aug. 14, 2014

Related U.S. Application Data

(60) Provisional application No. 61/757,810, filed on Jan. 29, 2013.

(51) Int. Cl.
*G03B 21/20* (2006.01)
*H04N 9/31* (2006.01)
*G02B 26/00* (2006.01)
*G02B 27/10* (2006.01)
*G02B 27/14* (2006.01)

(52) U.S. Cl.
CPC ......... *G02B 26/008* (2013.01); *G02B 27/102* (2013.01); *G03B 21/204* (2013.01); *H04N 9/3158* (2013.01); *G02B 27/143* (2013.01)

(58) Field of Classification Search
CPC .............. G03B 21/204; G03B 21/2013; G03B 21/2073; G03B 21/2033; H04N 9/3158; H04N 9/3161; H04N 9/3164
See application file for complete search history.

(56) References Cited

U.S. PATENT DOCUMENTS

| 7,070,300 | B2 | 7/2006 | Harbers et al. | |
|---|---|---|---|---|
| 7,547,114 | B2 | 6/2009 | Li et al. | |
| 2007/0019408 | A1 | 1/2007 | McGuire, Jr. et al. | |
| 2008/0310845 | A1 | 12/2008 | Xu | |
| 2009/0034284 | A1 | 2/2009 | Li et al. | |
| 2009/0284148 | A1 | 11/2009 | Iwanaga | |
| 2012/0242912 | A1* | 9/2012 | Kitano | H04N 9/3111 348/759 |

(Continued)

*Primary Examiner* — William C Dowling
*Assistant Examiner* — Ryan Howard
(74) *Attorney, Agent, or Firm* — Michael A. Davis, Jr.; Charles A. Brill; Frank D. Cimino

(57) ABSTRACT

An illuminator for an imaging system using a spatial light modulator has first color laser light directed by a dichroic element to a first annular band on a rotatable member. The first band includes phosphor segments that respond to illumination by the first color light to emit second and third color light along a first path back to the dichroic element for output, and a light transmitting or reflecting segment that transmits or reflects the first color along the same or a second path back to the dichroic element for output. The output light is directed to a second annular band on the same or a different rotatable member. The second band includes filter segments corresponded to respectively selectively filter output light generated by the first band segments.

9 Claims, 7 Drawing Sheets

(56) References Cited

U.S. PATENT DOCUMENTS

2013/0088471 A1* 4/2013 Kitano ................. H04N 9/3114
345/208
2013/0100417 A1* 4/2013 Yang .................... G03B 21/204
353/31

* cited by examiner

COLOR SEQUENCE ILLUMINATION SYSTEM WITH PHOSPHOR LIGHT FILTER

This application claims the benefit of Provisional Application No. 61/757,810, filed Jan. 29, 2013, and the entirety of which is hereby incorporated by reference.

BACKGROUND

This relates to generation of sequential color illumination in solid state laser projection systems and the like.

Current solid state illuminated projectors producing more than about 1000 lumens utilize blue laser diodes and a spinning phosphor wheel. The illumination typically involves sequential generation of blue, green and red color light, and the sequentially generated different colored light is directed to a pixel light modulator of one type or other. The pixel light modulator may, for example, be a spatial light modulator such as a Texas Instruments DLP™ digital micromirror device (DMD) whose mirrors are individually set using pulse-width modulation (PWM) intensity grayscaling with settings synchronized to respective time segments for illumination of the mirrors by the respective sequentially generated colors.

In a typical solid state illumination (SSI) system, at least red, green and blue color illumination time segments are generated. Other color time segments (viz., yellow or other secondary color, white, and black periods) are also possible. In a usual arrangement, a green color light is generated indirectly by illuminating a green color-emitting segment of the spinning phosphor wheel with light from a typically blue laser light emitting diode (LED), while red color light is generated either indirectly by illuminating a red color-emitting phosphor segment of the same wheel with the blue laser light or directly by using a separate red light LED. The blue color light is usually generated directly using the blue laser light itself. A diffuser is typically used to reduce speckle from the coherent light.

An example solid state projector using blue laser LEDs and a phosphor color wheel as an illumination system and a spatial light modulator for modulation of the generated illumination is described in application Ser. No. 13/652,129 filed Oct. 15, 2012, entitled "Projector Light Source and System, Including Configuration for Display of 3D Images," the entirety of which is incorporated herein by reference. Such system utilizes blue lasers as a direct source of blue color light and utilizes the blue lasers as an indirect source of other color light by energizing other color light producing phosphors with the blue color light from the blue lasers. The overall layout for such a system is illustrated in FIG. 1, which has an insert showing the combining of outputs from banks of lasers into a single diffused blue light input beam. Because the illumination system generates one output color directly from the input source light and one or more other output colors indirectly by secondary emission, projectors utilizing such illumination systems are often referred to as hybrid SSI laser projectors.

The arrangement 100 shown in FIG. 1 is typical for a solid state projector that uses blue lasers and a phosphor wheel as a sequential color illumination source. One or more banks of lasers 102 direct blue color coherent laser light onto a dichroic filter 104 which reflects the laser light via a focusing lens 106 onto a color wheel 108. The color wheel 108 includes angularly spaced segments of respective different color wavelength light emitting phosphors formed over a light reflecting surface, as well as clear laser blue color wavelength light transmitting segments. The laser light is focused to be sequentially incident on the respective different segments as the wheel 108 is rotated.

A typical phosphor color wheel 108 as used in the described solid state projector has annular arcuate region segments (viz., sectors of an annulus defined by two radii separated by an inner angle and by the inner and outer arcs they intercept) coated with different color emitting phosphors disposed at respective angularly spaced positions in a ring, circumferentially about a circular wheel. An example phosphor color wheel of this type is shown in FIGS. 2 and 3 and described in application Ser. No. 14/163,985 filed Jan. 24, 2014, entitled "Split Phosphor/Slit Color Wheel Segment for Color Generation in Solid-State Illumination System," the entirety of which is incorporated herein by reference.

For image display, the color wheel 108 is rotated to move the phosphor coated ring through a given angular rotation (e.g., ½, 1 or 2 revolutions) during an image frame display time (eye integration time). The laser light input beam is directed onto the wheel annulus to illuminate an area (viz., spot) through which the different segments pass sequentially as the wheel rotates. The wheel is typically rotated at a constant rotational speed, with the angular extent of the respective different color generating segments determined, at least in part, by the relative brightnesses of the generated illumination.

In the example wheel shown in FIGS. 2 and 3, the wheel is a circular wheel having a reflective aluminum front surface (surface facing the input beam) 210 and different color generating annular sectors 212, 214, 216, 218 angularly spaced circumferentially about a marginal band. The wheel 108 is mounted centrally for rotation about a shaft at an adjustably settable, constant rotational speed (viz., one revolution per image frame display time). The illustrated wheel has two instances of angularly-spaced blue 212, green 214, red 216 and yellow 218 color generating segments which are sequentially driven past the incident input beam. Although not required, the illustrated sequence is the same in each instance. The blue segment 212 comprises a slit 220 for generating blue color by passing the input beam through the slit 220 and around an optical wraparound path (e.g., comprising reflecting elements 110, 112, 114 shown in FIG. 1), back to the projection optics. The green, red and yellow segments 214, 216, 218 comprise respective annular regions coated with different color light-emitting phosphors for respectively emitting corresponding green, red and yellow color light when energized by the incident input beam.

As the wheel 108 rotates, blue laser light from the lasers 102 is reflected by one side of filter 104 (viz., blue reflective dichroic mirror) to be sequentially incident upon the slit segments 212 and the green, red and yellow light emitting phosphor segments 214, 216, 218, respectively. When wheel 108 is rotated to a position where incident light is directed at a slit segment 212, blue light passes through slit 220 and is routed by the optical wraparound path 110, 112, 114 back to the other side of filter 104 which reflects the returned blue light along an optical path for modulation by a spatial light modulator and projection of an image onto a screen or other display surface. A diffuser 116 is optionally provided in the wraparound path to reduce imaging speckle using the returned laser light. When wheel 108 is rotated to a position where incident light is directed at a phosphor covered segment 214, 216, 218, the phosphors at that segment are energized to emit the color wavelength light characteristics of the phosphors of that segment. For the wheel 108 arrangement illustrated in FIG. 2, as the wheel rotates the laser light is first incident on a green light emitting phosphor segment 214, then on a red light emitting phosphor segment 216, and then on a yellow phosphor emitting segment 218. In each case, the emitted color (G, R, Y) is directed back through the lens 106 toward the dichroic filter 104. The filter 104 passes the phosphor emitted color for modulation by the spatial light modulator and projection of the image onto the display surface. In the illustrated arrangement, although not required, the same filter 104 is used to reflect both the incident and the returned blue light, as well as to transmit the green, red and yellow phosphor emitted light; and, although also not required, the returned blue light and transmitted green, red and yellow light are directed along the same optical path for modulation and image projection.

The spatial light modulator—which may, for example, include an addressable micromirror array such as a Texas Instruments DLP™ digital micromirror device (DMD)—includes light modulating elements that can be individually controlled in synchronism with the generated light to set the illumination intensity for that color contribution to corresponding individual ones of pixels of the displayed image. For example, the modulating elements may be controlled to provide a grayscale contribution of each color for the pixels using "on"/"off" settings specified for different time slices of a pulse width modulation (PWM) cycle time, with the greater number of "on" times providing a greater intensity, and the greater number of "off" times providing a lesser intensity—the cumulation of the PWM cycles for all the colors being integrated by the eye to give a particular color point and intensity for each pixel during a given image frame display time. Control of the modulating elements in a typical micromirror array implementation will be by changing the positioning of the individual mirrors to reflect the generated light toward or away from the display surface in accordance with weighted time segment bit plane color sequences developed from color contribution intensity data received on a frame-by-frame basis from an input imaging data stream. The data for the bits of the different color bit planes are developed and loaded in correspondence with the colors, order and timing characteristics of the particular color wheel utilized, the illustrated arrangement being just one example.

When rotated at constant rotational speed, the arcuate (angular) extent of each segment 212, 214, 216, 218 determines the amount of time that the color generated by that segment will be available for modulation to produce the corresponding color intensity contribution for the various pixels of the displayed image. The relative arcuate extents are thus established, at least in part, based upon the relative maximum intensities of the segment generated colors. Thus, the blue segment 212—which generates the brightest color because it passes the input blue laser light directly for generation of the blue color illumination—has the shortest angular extent, and the green segment 214—which generates the weakest intensity light by incident laser light energization of the color producing phosphors—has the longest angular extent. The illustrative layout shown in FIG. 2, for example, provides blue, green, red and yellow color sequences using 2×28° blue laser light transmitting slit segments 212, 2×61° green light emitting phosphor segments 214, 2×51° red light emitting phosphor segments 216, and 2×40° yellow light emitting phosphor segments 218.

In such arrangement, phosphors determine the red and green color points, and laser light passing through the opening and the laser input beam wavelength determine the blue color point. For the wheel shown in FIG. 2, the opening 220 defining the slit takes the form of a window with an arcuate metal strip 222 left at the wheel circumference, radially outwardly bordering the window. This strip 222 leaves the circular wheel 108 with an unbroken outer edge that improves rotational stability and reduces audible noise generation. The laser beam (spot) is directed to completely pass through the window opening. FIG. 3 shows an enlarged side view section of one example implementation of a clear (blue) segment 212 of the color wheel of FIG. 2. To reduce speckle and otherwise smooth the directly utilized blue laser light, a diffuser is typically added in the blue light source or reuse path.

Other arrangements for generating color sequences during relative movement of a color wheel and input light beam are also possible. An example color wheel having concentric annular tracks or rings of the respective different color emitting phosphors located at different radially spaced locations is described in Patent Application Pub. No. US 2011/0211333 A1, published Sep. 1, 2011, entitled "Wavelength Conversion," the entirety of which is incorporated herein by reference.

An example of a blue laser light source used in SSI systems is a blue laser diode, such as commercially available from Nichia, that emits light in the 445-448 nm wavelength spectral region. Such laser diodes are relatively inexpensive and efficient. However, the dominant wavelengths of such less expensive laser diodes are shorter than typically used in non-SSI illumination system, so may result in a less aesthetically pleasing purplish blue color contribution in the displayed image.

Several approaches have been suggested to modify the blue color emitted using light from the blue lasers as a direct source for blue color generation. The use of cyan phosphor in combination with blue laser light in a system using a blue light wraparound path is described in application Ser. No. 14/155,009 filed Jan. 14, 2014, entitled "Hybrid Laser Excited Phosphor Illumination and Method," the entirety of which is incorporated herein by reference. Other approaches for combining phosphor emitted cyan light with blue laser light for blue color generation are described in application Ser. No. 14/157,269 filed Jan. 16, 2014, entitled "Phosphor Wheel Illumination Using Laser Light Reflective Region," the entirety of which is incorporated herein by reference. The use of cyan emission in combination with diffused blue laser light moves the blue color point coordinate to a more desirable position.

When blue laser light is used as an input light beam for energizing phosphors coated over a reflective surface during generation of other colors (e.g., for generation of green, red and yellow colors in illumination systems of the types described in the incorporated references), some blue laser light may reflect or otherwise be directed along with the other generated color into the projection process. This may undesirably interfere with the color point of the other color. Furthermore, the undesired intrusion of light from the input beam may vary with the arc-wise travel of an input laser beam across a phosphor wheel segment, and may also vary in an unrepeatable way from one repetition to the next of the travel of a same segment. This may make it difficult to correct unwanted intrusion by modification of PWM bit sequences utilized for establishing pixel intensities through integration of contributions of the respective wheel segment emissions in the resulting displayed image.

Additionally, the generation of respective colors from phosphors coating a particular segment may not provide the desired color point even for the generated color, or may provide a broader bandwidth than desirable.

SUMMARY

An illumination system of a type suitable for sequential color illumination of a spatial light modulator in a projector for the display of images, has a color wheel with phosphor coated segments for generating respective different colors for use in display of a projected image. The system includes a second filter wheel or another portion of the same wheel having one or more filter segments whose movement is coordinated with the phosphor segments for filtering the light generated by the phosphor coated segments. In some embodiments, the second wheel or portion of the same wheel includes a diffusion segment for diffusing light from a segment configured to produce light through transmission/reflection of all or a portion of the input light, either alone or in combination with light emitted by phosphor (e.g., blue segment generating blue light with a color point established by a combination of input blue laser light and cyan phosphor-emitted light). In some embodiments, the filter wheel coordinates to separate wavelengths of the color segment generated light, for providing different wavelengths of a same color for coordination with correspondingly filtered lenses of eyewear in a 3D image projection system.

The described embodiments enable filtering of phosphor emitted light to provide a desired same or different color wavelength light for illumination in the projection process. The filtering may, for example, provide a narrower bandwidth version of a same color (viz., specific wavelength of red from a broader spectrum red emission) onto a spatial light modulator as a component for integration in a PWM weighted time subinterval bit plane sequence for development of displayed image pixel colors and intensities based on pixel characteristics data for image frames contained in an image input data stream. The filtering may also provide extracted single color wavelengths (e.g., red or blue) from light generated by combination color producing phosphors (e.g., generated from yellow or orange producing phosphors) to generate preferred color points different from those produced by the phosphor (or combination of phosphors or combination of phosphors and input laser light). The filtering may also be coordinated to produce tailored illumination color, such as to correct spoke crossings between phosphor wheel segments, or to match/complement blendings of phosphors from one segment to another (or one ring to another).

The described embodiments may also enable different filtering of generated light from multiple instances of same segments (viz., 2×n instances of same color generation per frame display time) in order to produce 3D images using, for example, corresponding filtering in respective left- and right-eye lenses in passive eyewear 3D image production.

DETAILED DESCRIPTION OF EXAMPLE EMBODIMENTS

Figure 1:
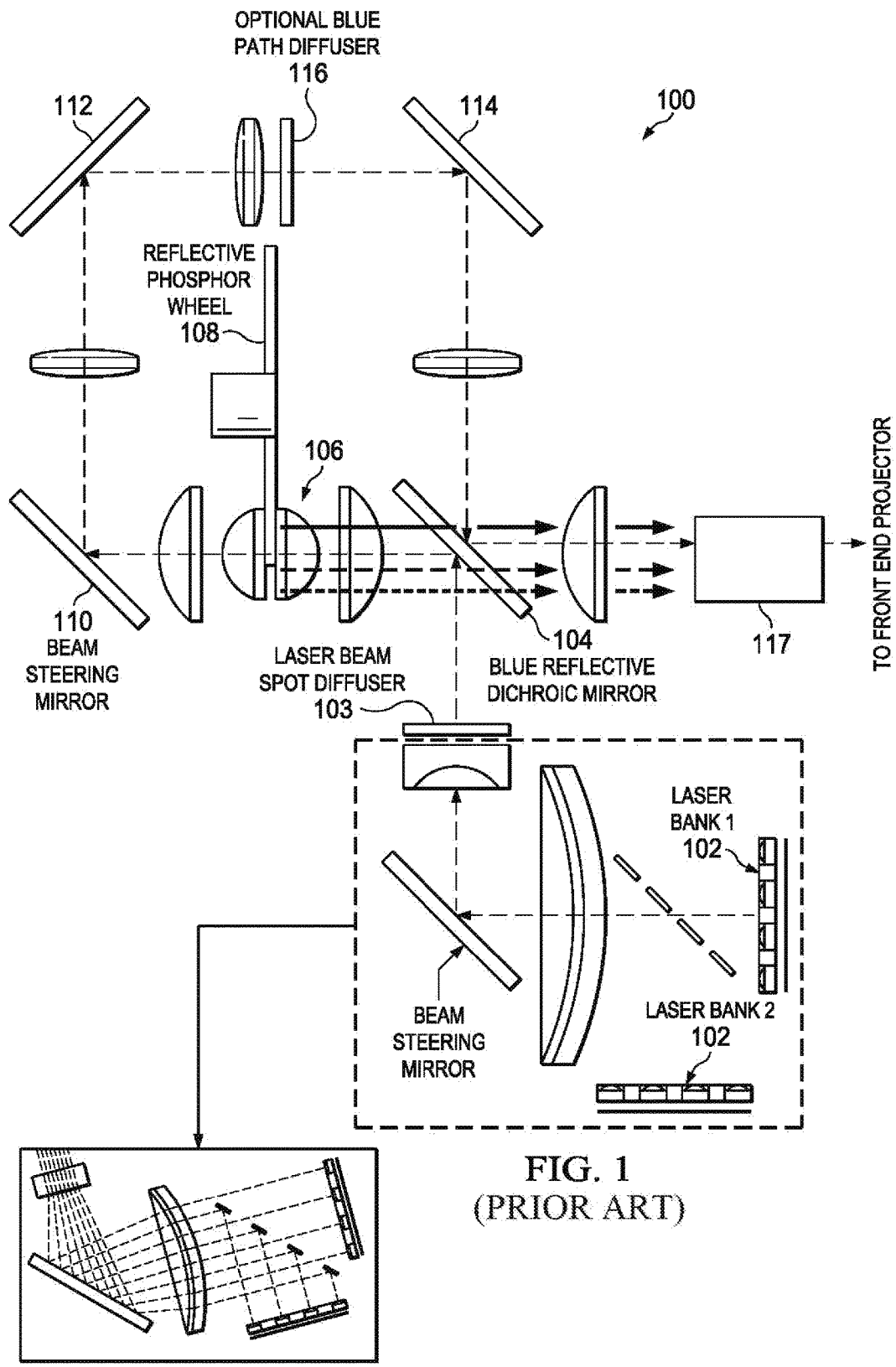
FIG. 1 illustrates an example solid state projector using laser light and a phosphor color wheel as an illumination system.

FIG. 1 illustrates a typical solid state illumination system that utilizes a blue laser light source for generation of a sequence of (e.g., blue, red, green and yellow) colors for projection of images through illumination of a spatial light modulator having individual image pixel modulator elements set according to a PWM scheme using weighted time slots in synchronism with the generation of the respective colors. Laser light from one or more banks of LEDs 102 is developed into an input light stream (see inset) and passed through a diffuser 103 to a 45° angled dichroic filter 104 which reflects the blue input light through optics 106 onto a respective color generating segment of a rotating phosphor wheel 108. A blue light segment of the wheel (e.g., 212 in FIG. 2) is accommodated to pass and/or reflect a portion of the blue light for use in generation of blue light in the illumination color sequence for the spatial light modulator. Other segments (e.g., 214, 216, 218) of the wheel 108 are accommodated with phosphor coatings which emit respective other colors of light (e.g., red, green and yellow) for generating corresponding other colors of light in the spatial light modulator illumination sequence. Light generated for the sequence of colors is passed through an integrator (light tunnel) or other light conditioning element or elements 117 to a projection optical path for modulation by the spatial light modulator and for projection with other elements of a projection optics arrangement to form an image on a display surface.

Figure 2:
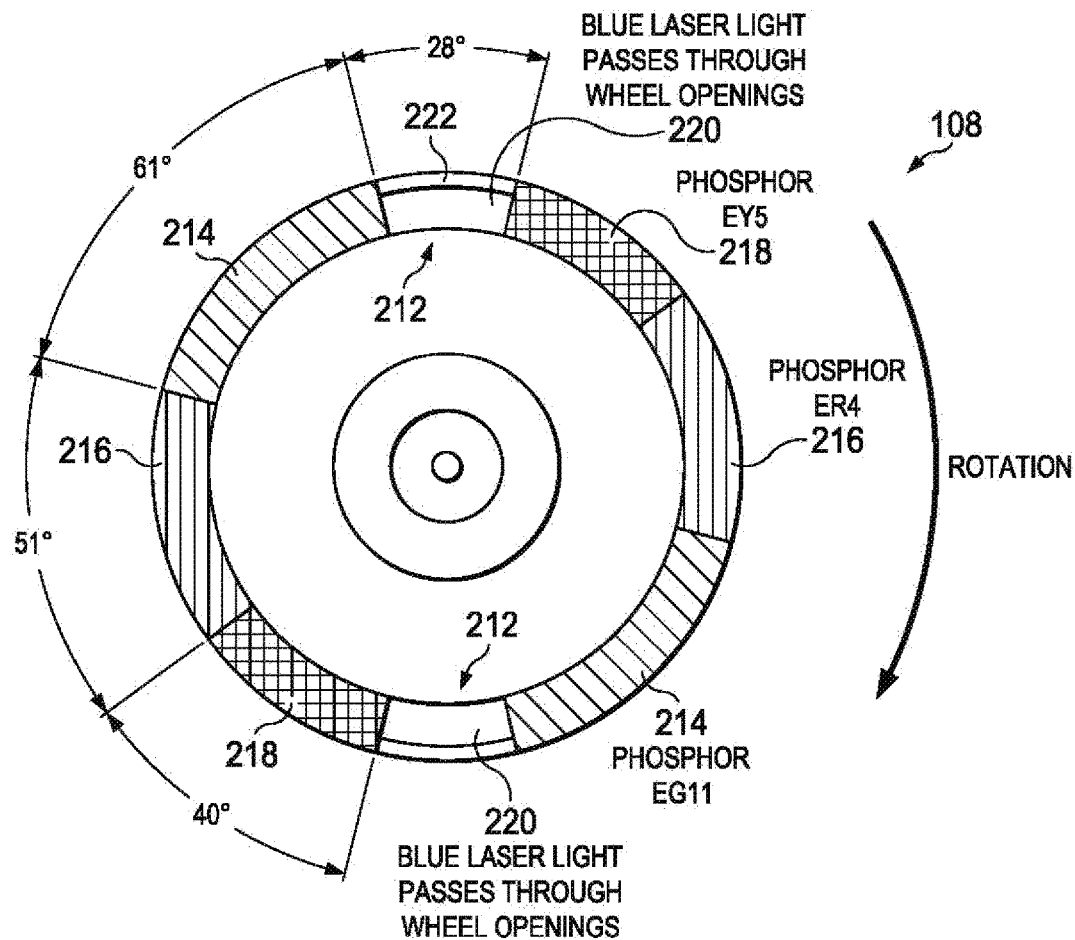
FIG. 2 illustrates an example color wheel usable in the illumination system of FIG. 1.
Figure 3:
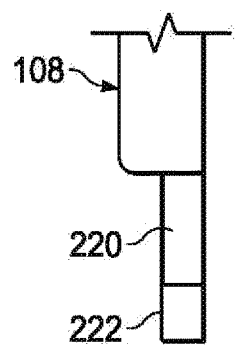
FIG. 3 shows an enlarged side view section of one example implementation of a segment of the color wheel of FIG. 2.

The arrangement shown in FIGS. 1 and 2 develops the blue light by transmission through an opening (e.g., 220) at one or more blue segments 212 defined for the phosphor wheel 108. At least a portion of the input laser light from lasers 102 passes through the wheel 108 and is directed via one or more light steering optics elements (shown as mirrors 110, 112, 114 in FIG. 1) back to the dichroic filter 104. In the illustrated arrangement, a dichroic mirror 104 is chosen having wavelength filtering reflective/transmissive characteristics that reflect the blue light, but pass the phosphor emitted light of the other respective generated colors. A similar arrangement is described in application Ser. No. 13/652,129. Other arrangements that generate a blue color using blue light from the laser input light in a wraparound path are described in application Ser. Nos. 14/155,009 and 14/163,985. These other arrangements combine the color generated via the wraparound path with a cyan color emitted by a cyan color emitting phosphor formed over a portion of the one or more blue segments. The combination approach may provide a less purplish blue color point than produced by blue laser light from some currently commercially available laser LEDs. The modified generated blue color point is considered more suitable for some applications.

Instead of generating the blue light for spatial light modulator illumination by passing the blue laser input light through an opening in the phosphor wheel, the blue light may also be generated by reflection from the phosphor wheel. For example, one or more of the blue segments may include a reflective portion for reflecting blue light back in the direction of the incident laser light. An arrangement for this type, that combines a cyan color emitting phosphor with the reutilized input laser light to achieve a modified generated blue light color point is described in application Ser. No. 14/157,269.

Figure 4:
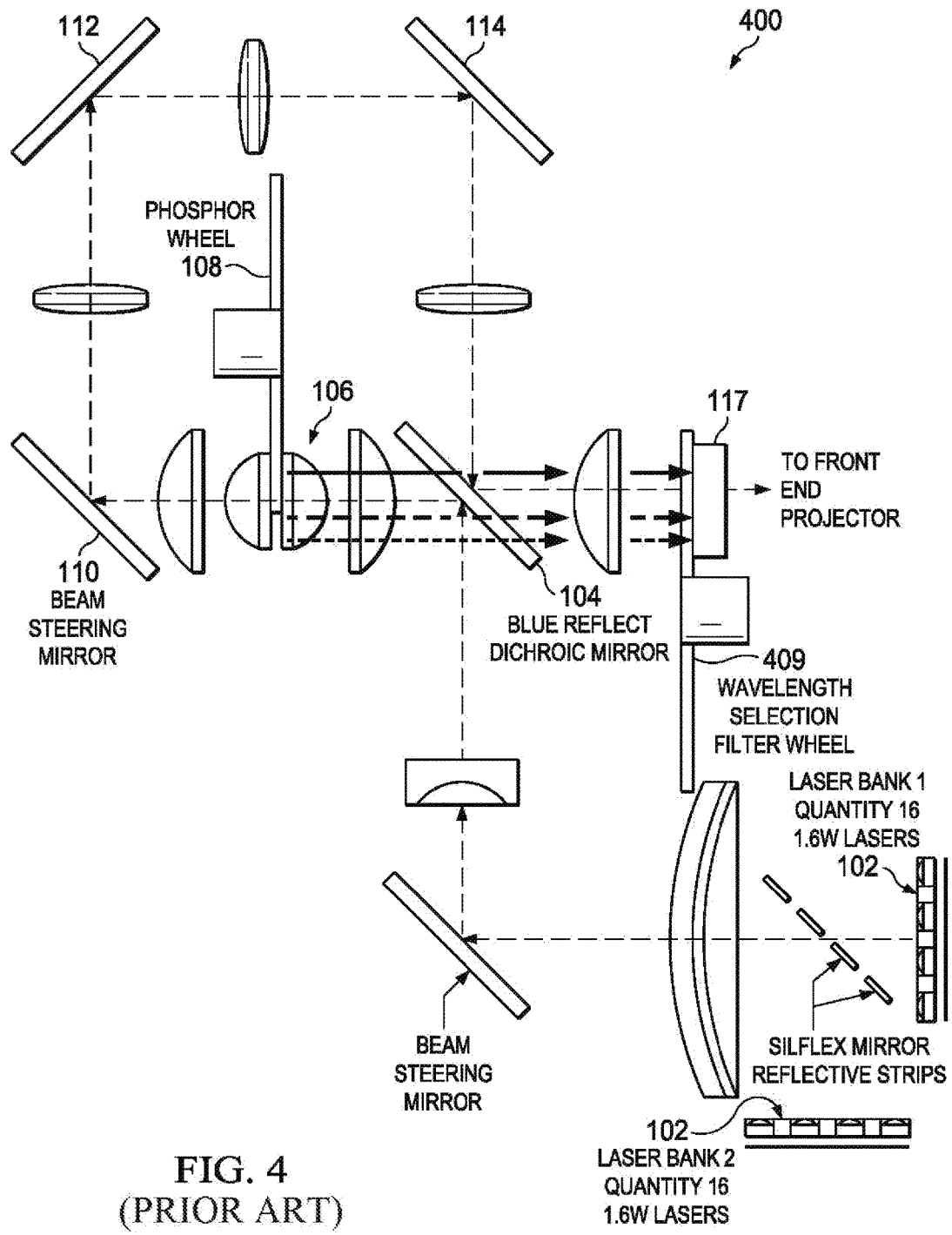
FIG. 4 illustrates image projection using an illumination system having a phosphor wheel and a filter color wheel.

An example implementation of an illumination system 400 incorporating coordinated phosphor and filter segments in one or more color wheels is illustrated in FIG. 4. For ease of comparison with the arrangement of FIG. 1, the arrangement shown in FIG. 4 utilizes a wraparound path for reutilization of the input laser light for generating the blue light from one or more blue segments of the phosphor wheel 108.

As with the illumination system 100 shown in FIG. 1, the system 400 shown in FIG. 4 utilizes a blue laser light source 102 for generation of a sequence of (viz., blue, red, green and yellow) colors for projection of images through illumination of a spatial light modulator having individual image pixel modulator elements set according to a PWM scheme using weighted time slots in synchronism with the generation of the respective colors. And, similar to the arrangement 100 in FIG. 1, a blue light segment of the wheel is accommodated to pass and/or reflect at least a portion of the input blue laser light for generation, either alone or in combination with a (e.g., cyan) color emitting phosphor, of a generated blue light for illumination of the spatial light modulator in a synchronized one or more time intervals of an illumination color sequence. In departure from the system shown in FIG. 1 however, the system 400 of FIG. 4 utilizes a downstream filter wheel 409 for further defining/refining the generated light.

The filter wheel 409 may have segments respectively corresponding to the different color generating segments of the phosphor wheel 108, and be rotated in synchronism with the phosphor wheel 108 so that a particular filter segment is rotated into position at a time for filtering a particular color generated at a same time by a particular respective phosphor wheel segment. The characteristics of the filter segments are chosen to suit individual needs and preferences, coordinating the light sequence generated by the phosphor wheel with the filtering by the filter wheel to achieve the desired end color sequence for illumination of the spatial light modulator. For example, characteristics of a filter segment may be chosen to provide a narrow band filtering of a broader band production of a same color. Or, the filter may exclude components of a phosphor generated color to isolate one or more other components of the generated color, as for example in the filtering of light from a yellow or orange color emitting phosphor to generate a red color.

Figure 5:
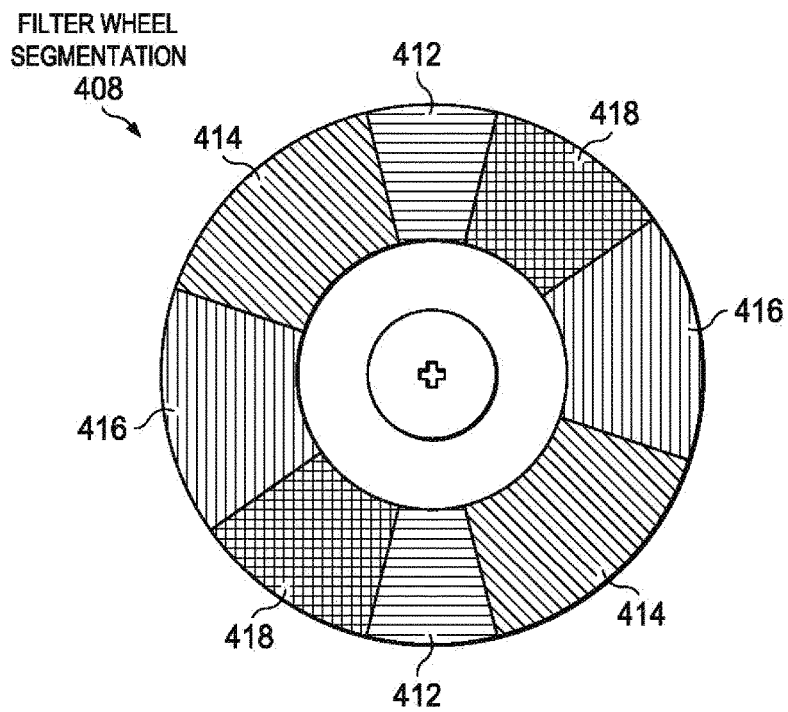
FIG. 5 illustrates an example configuration of a phosphor color wheel usable in the illumination system of FIG. 4.

In the case of a phosphor wheel 108 such as shown in FIG. 2, for example, the filter wheel 409 may have a configuration such as shown in FIG. 5, with blue, green, red and yellow wavelength selective filter segments 412, 414, 416, 418 respectively corresponding to the different corresponding blue, green, red and yellow color generating segments 212, 214, 216, 218 of the phosphor wheel 108 shown in FIG. 2. Filter wheel 409 is then rotated in synchronism with phosphor wheel 108 to bring each filter segment 412, 414, 416, 418 into respective alignment with corresponding light generated by the corresponding segment 212, 214, 216, 218, with characteristics of the filter segments chosen to pass desired wavelengths and block undesired wavelengths of the generated light. In situations where unwanted light from the input blue laser light source may leak (e.g., reflect) into the light generated by non-blue segments of the wheel, filter segments 414, 416, 418 of filter wheel 409 brought into alignment with light generated by the phosphor wheel non-blue segments (viz., red 214, green 216, yellow 218) may be defined to reject such unwanted blue light.

If appropriate for specific needs and preferences, one or more of the filter segments 412, 414, 416, 418 may be provided with a clear filter or slit to pass all of the light generated by the corresponding respective phosphor wheel segment 212, 214, 216, 218. For example, where blue laser light is passed through a full or partial slit or opening in a segment 212 of phosphor wheel 108, a corresponding full or partial slit or opening (or combination filter and slit or opening) may be provided in the matching segment 412 of filter wheel 400.

In some embodiments a diffuser may be used instead of, or in addition to, a filter element at a blue filter segment of the filter wheel. A diffuser acts to diffuse the coherent laser light in order to reduce speckle and present a greater homogeneity in the generated blue light. Positioning a diffuser upstream of the 45° dichroic filter 104, such as shown by diffuser 103 in in FIG. 1 may have an adverse effect (viz., reduce) on the intensity of light produced by the respective phosphor coatings of the phosphor wheel 108, however. Moving the position of the diffusion (or at least a portion thereof) from the indicated upstream position, downstream to the filter wheel 409 may reduce an adverse effect, thereby increasing the output of the phosphor color production. Limiting the diffuser (or at least a portion of the diffusion effect) to the filter segments of the filter wheel 409 that align with light generated form the corresponding blue color segment of the phosphor wheel 108 may be a suitable implementation, as light generated by other color phosphor wheel segments may already be diffused light. In some cases, a thin coating of cyan, green or other phosphor may be added as a diffuser (or, as an additional diffuser) at a blue segment of the color wheel 108, with optional filtering, for example, to a desired cyan component added to blue by suitable filtering at the filter wheel 409. The filter may be on the backside of the filter wheel.

Although not shown in FIG. 4, the use of separate filter segments on a filter wheel that rotates in synchronism for aligning with corresponding color generating segments of a rotating phosphor wheel may also be implemented in a phosphor wheel having one or more reflecting portions of a blue segment for reflecting, rather than transmitting, a part of the input laser light. In particular, a filter wheel similar to that shown in FIG. 4 may also be employed in an illumination system that uses a quarter wave plate and a polarization selective 45° dichroic filter, such as described in application Ser. No. 14/157,269.

Figure 6:
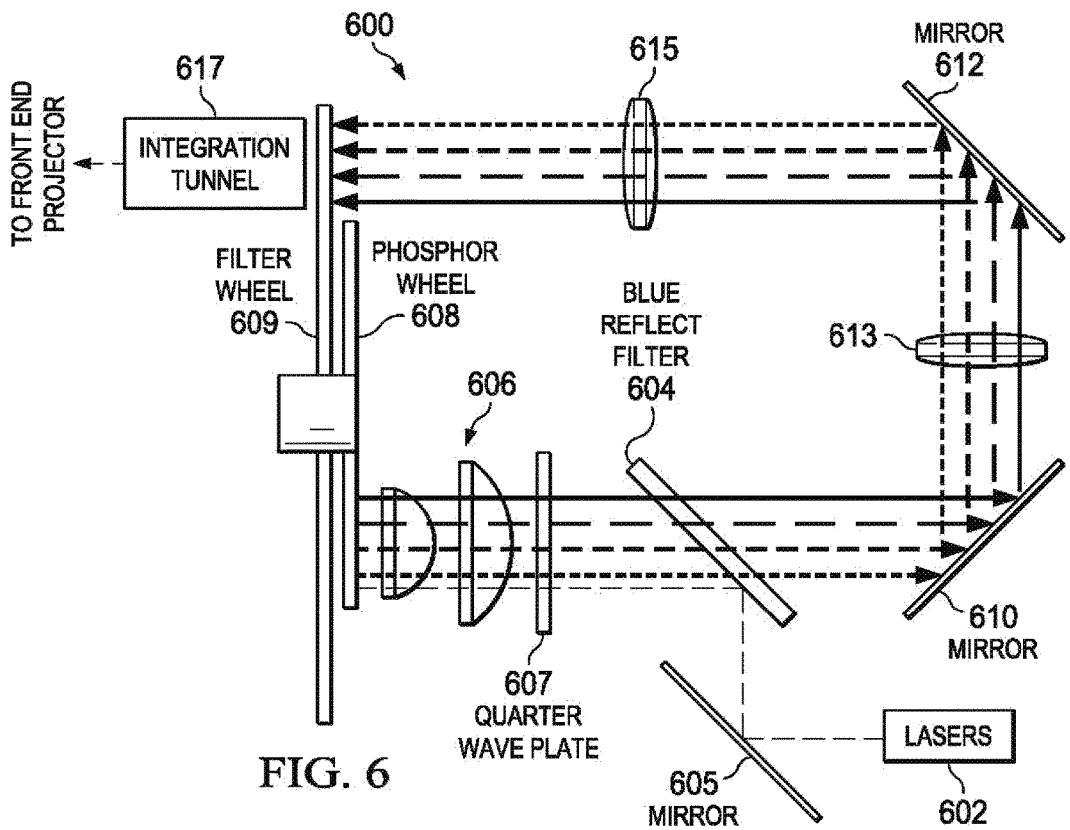
FIGS. 6 and 7 illustrate wheel arrangements usable in an illumination system such as shown in FIG. 4.

FIG. 6 illustrates an example implementation of an illumination system 600 incorporating coordinated phosphor and filter segments in one or more color wheels, wherein blue segments of blue light generating phosphor wheel segments use reflection for at least a portion of the blue light generation.

In FIG. 6, light from a bank of blue laser LEDs 602 is reflected by a mirror 605 onto a first surface of a 45° angled blue reflect dichroic filter 604. As with the arrangement described in application Ser. No. 14/157,269, the 45° filter 604 reflects a first direction (one of S or P) polarized portion of the incident input laser light and transmits a second direction (other of S or P) orthogonally polarized portion of the input light. The reflected portion is directed through a quarter wave plate (QWP) 607 and focusing optics 606 towards the phosphor wheel 608 and onto an annular position of the wheel (viz., spot) through which the various segments (see FIG. 2) pass during wheel rotation. As described in application Ser. No. 14/157,269, at least some of the input light incident on the blue segment or segments of the color wheel 608 during an imaging frame time will be reflected back from the wheel. The reflected portion passes again through the quarter wave plate 607 and back to the 45° filter 604. The two passes (forward and reverse) of the input light reflected off the color wheel blue segment or segments shifts the polarization so that the returned light portion utilized to generate the blue color illumination (either alone or in combination with a transmitted portion of cyan or other phosphor emitted light) passes through the 45° filter 604 toward the spatial light modulator. And, similar to the arrangement previously described in connection with FIG. 4, the light is then directed for passage through a corresponding diffusion and/or filter segment (see FIG. 5) of a filter wheel 609.

Unlike the filter wheel ("color wheel") 409 in FIG. 4 however, the filter wheel 609 shown in FIG. 6 is mounted for simultaneous rotation on a same rotating shaft or spindle as the phosphor wheel 608. Mounting both wheels 608, 609 on a common shaft may simplify synchronization of the two wheel rotations to ensure that the correct segment of the filter wheel 609 is aligned with the corresponding light generating segment of the phosphor wheel 608. That is, when the blue (or red, or green, or yellow) light generating segment (212, 214, 216, 218 in FIG. 2) of the phosphor wheel 608 is aligned to receive the spot of input light from the blue laser light source, the corresponding blue (or red, or green, or yellow) light diffusing and/or filtering segment (412, 414, 416, 418 in FIG. 5) of the filter wheel 609 will be aligned to filter the light generated by the blue (or red, or green, or yellow) light generating segment. Such simplification may, however, come at the cost of losing some of the flexibility available where the filter wheel rotations are separately controllable. For example, where both wheels 608, 609 are rotated at the same speed, each revolution of one wheel will correspond to one revolution of the other wheel. With wheels rotatable at independently settable speeds, the rotation of one wheel can be set to occur at a multiple or fraction of the rotation of the other wheel, or the number of rotations of one wheel during a given time period may even be varied relative to the number of rotations or partial rotations of the other wheel.

As with the arrangement in FIG. 4, the characteristics of the segments of the filter wheel 609 in FIG. 6 can be set according to the needs and preferences of the colors generated by the corresponding different color generating segments of the phosphor wheel 608. As before, for example, the respective filter segments of the filter wheel 609 that align with non-blue color generating segments of the phosphor wheel 608 can be set to block the passage of unwanted blue laser light and/or can be set to control a color point of the phosphor emitted light. And, as before, the filter segments of the filter wheel 609 that align with the blue color generating segments of the phosphor wheel 608 can be set to diffuse and/or set the color point of the blue light (e.g., transmitted component of generated cyan light) passed to the spatial light modulator and projection optics.

The characteristics of the filter segments will typically be chosen to produce a uniform color point for illuminating a spatial light modulator throughout the angular passage of a particular phosphor wheel segment during rotation past the incident laser light spot for the generation of a corresponding particular color. However, this is not a requirement. The characteristics of each filter segment may instead be set to vary in a tailored way with the passage of the corresponding phosphor wheel segment past the incident light spot. And, in cases where the filter wheel and phosphor wheel rotations are independently settable, variations in filtering characteristics around the filter wheel may be dynamically brought into alignment with variations in the color of light generated by the phosphor wheel, with variations in the content of the images to be displayed, and so forth.

There is also no necessity to provide a one-to-one (or one-to-integer n) correspondence between filter wheel segments and phosphor wheel segments, or vice versa. Ones or portions of ones of either (or both) of the filter wheel segments or (and) phosphor wheel segments may be combined or cooperatively tailored to suit any number of varying needs and preferences. For example, in a common shaft mounted phosphor and filter wheel arrangement for generation of a blue, red, green, yellow light sequence arrangement (e.g., using phosphor and filter wheels 608, 609 driven by a single shaft such as shown in FIG. 6 and phosphor wheel segments arranged as shown by segments 212, 214, 216, 218 in FIG. 2), the filter wheel may have a blue laser light transmitting diffusion segment for each instance of the phosphor wheel blue color generating segment and a single blue laser light blocking filter segment covering all of the remaining non-blue generated light in the color sequence. That is, a first filter segment of the filter wheel will have an angular extent that matches the angular extent of a blue light segment of the phosphor wheel (viz., 28° arc for a phosphor wheel segment ordering as shown in FIG. 2), and a second filter segment will have an angular extent that matches a total or a sum of the angular extents of the red, green and yellow light segments (viz., 152° arc for the FIG. 2 ordering).

FIG. 6 illustrates the phosphor wheel 608 and filter wheel 609 as separate discs mounted for simultaneous rotation on a common shaft, with phosphor segments defined by annular segments (sectors of an annulus) provided at respective different angular positions about a ring on the first wheel 608 (e.g., as shown in FIG. 2) and with the filter segments and/or diffusion segments (also sectors of an annulus) defined (e.g., as shown in FIG. 5) at corresponded respective different angular positions about a second wheel 609. The illustrated discs 608, 609 have different diameters, with the first disc 608 having a smaller diameter and being placed ahead of the second disc 609 having a larger diameter. As the phosphor wheel disc 608 rotates, the incident spot of blue laser light reflected off the 45° dichroic filter 604 and focused on the phosphor ring of disc 608, sequentially strikes the respective different color generating phosphor segments to generate a corresponding sequence of different colored light. The generated light (with changed blue polarization component) passes through the 45° dichroic filter 604 and is steered by beam steering and focusing optical elements (illustrated as mirror 610, 612 and lens 613, 615 elements) in a wraparound path back to impinge upon an annular portion of the larger diameter filter wheel disc 609 not covered by the smaller diameter phosphor wheel disc 608. The colors generated sequentially by phosphor wheel 608 are then treated (filtered/diffused) by respective corresponded segments of the filter wheel 609, and passed to an integration tunnel or similar optical element or elements 617 to provide a filtered/diffused version of the generated color sequence onto the spatial light modulator for modulation and projection of a displayed image.

Figure 7:
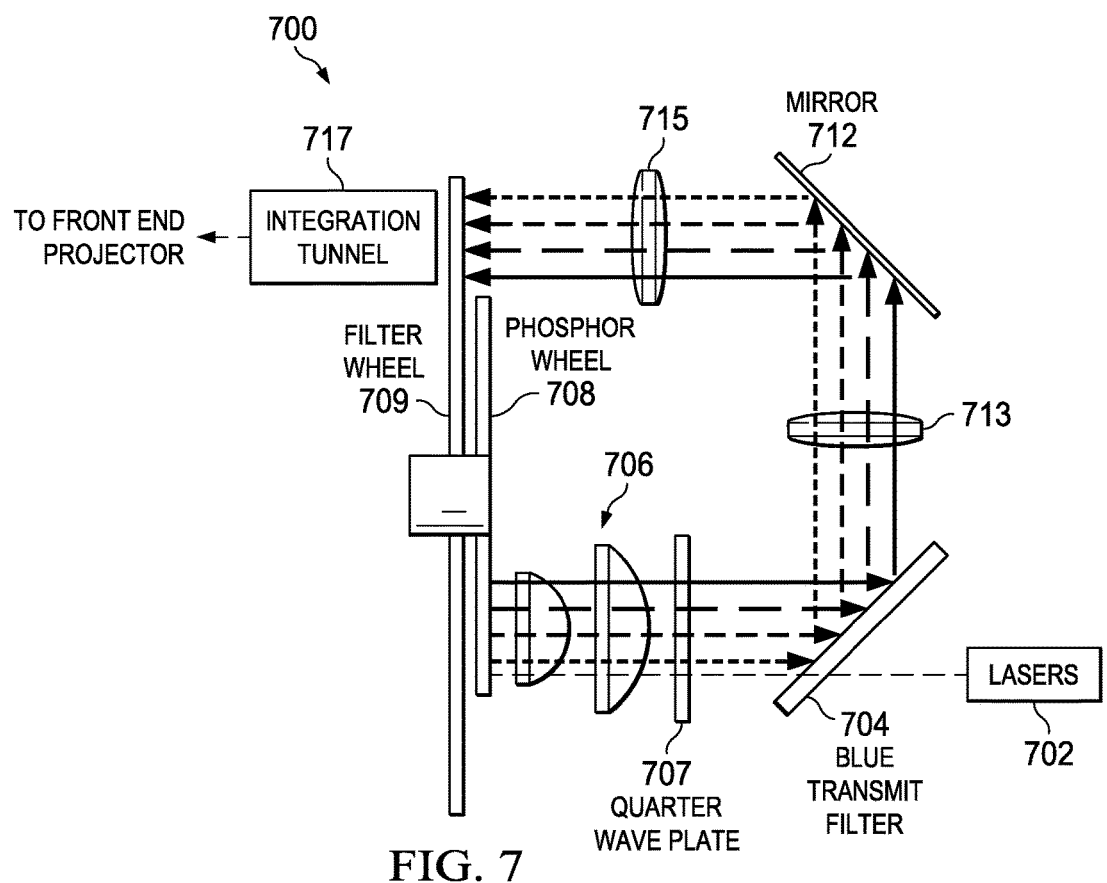

FIG. 7 illustrates a modified arrangement 700 which also generates a blue color light using reflection of at least a portion of the input laser light. Here, the characteristics of the 45° dichroic filter 704 and its placement relative to the light from source lasers 702 are chosen so that the portion of laser input light utilized for the color sequence generation is blue light with a polarization direction that is transmitted, rather than reflected, by the angled filter 704. The transmitted polarized portion of the input light passes through the quarter wave plate 707 and optics elements 706 and strikes the phosphor wheel 708 where at least a portion is reflected by the blue segment or segments (with or without additional generation of cyan or other blue color point modifying phosphor generated light), and where other color light is generated by striking the other color generating phosphors in other color segments. The reflected input light portion and phosphor generated colors are directed back through the quarter wave plate 707 and back toward the 45° dichroic filter 704, where the changed polarization reflected blue laser light is now reflected in sequence with reflected other color phosphor emitted light through the beam steering path (mirror 712 and lens elements 713, 715) toward corresponding segments of the filter wheel 709. As before, the phosphor and filter segments may be formed on separate wheels (e.g., the separate discs 708, 709 illustrated in FIG. 7) or may be formed at different locations on a common wheel (e.g., color generating segments and filter segments angularly distributed about a single disc in respective inner and outer annular bands at different radii).

Figure 8:
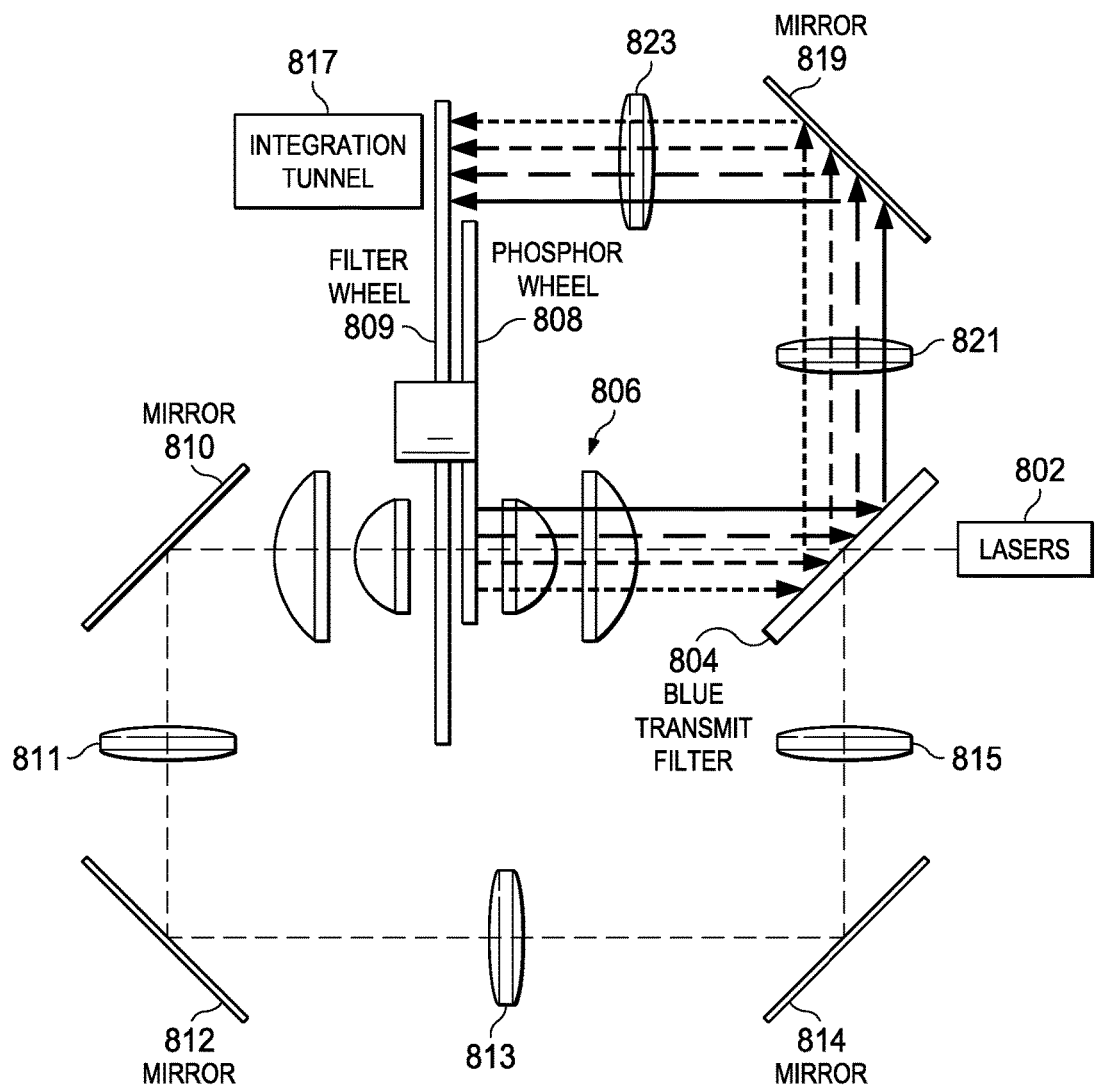
FIGS. 8 and 9 illustrate wheel arrangements providing multiple light generation channels.

FIG. 8 illustrates an implementation of similar principles applied to an arrangement 800 that includes a phosphor wheel with a wraparound path for generating blue color light using at least a portion of the input laser light. Here, for generating blue color illumination, a portion of blue laser light incident from the laser source 802 is transmitted through the 45° dichroic filter 804 and through an opening in the phosphor wheel 808, around a wraparound path (made up of mirror 810, 812, 814 and lens 811, 813, 815 elements) back to the 45° dichroic filter 804 which transmits it via a beam steering path (made up of mirror 819 and lens 821, 823 elements) to a corresponding filter segment filtering/diffusing portion of the filter wheel 809. The colors generated by the other color segments of the phosphor wheel 808 are generated by the respective other color generating phosphor segments and reflected by the 45° dichroic filter 804 via the same beam steering path to their respective corresponding filter segments of the filter wheel 809.

In the illustrated configuration, an opening is provided in a respective blue filter segment portion of the filter wheel 809 aligned with the opening in the blue color generating segment of the phosphor wheel 808. However, in other arrangements, different accommodation may be made to direct the transmitted blue input light portion back along the wraparound path. For example, the phosphor and filter wheels 808, 809 may be separated by a sufficient distance to permit a mirror or other transmitted blue light beam deflecting/reflecting element to be placed between the opening in the phosphor wheel blue segment and the filter wheel structure. For another example, a mirrored or other beam directing contour may be integrated into the structure of the filter wheel 809 to directly steer the portion of incident light from the phosphor wheel opening to the wraparound path. Alternatively, the portion of incident laser light reutilized in generating the blue color contribution to the sequence may be steered directly toward the projection optics along a path that does not transit the 45° dichroic filter 804 a second time. Such alternative routing may or may not pass through a rest of the beam steering path traversed by other colors generated from the 45° dichroic filter 804 to the respective corresponding filter wheel segments, and may even send the reutilized light portion directly to the integration tunnel 817 without passing a segment on the filter wheel 809. In such case, the light may be directed through a diffuser not integrated with the filter wheel 809.

Figure 9:
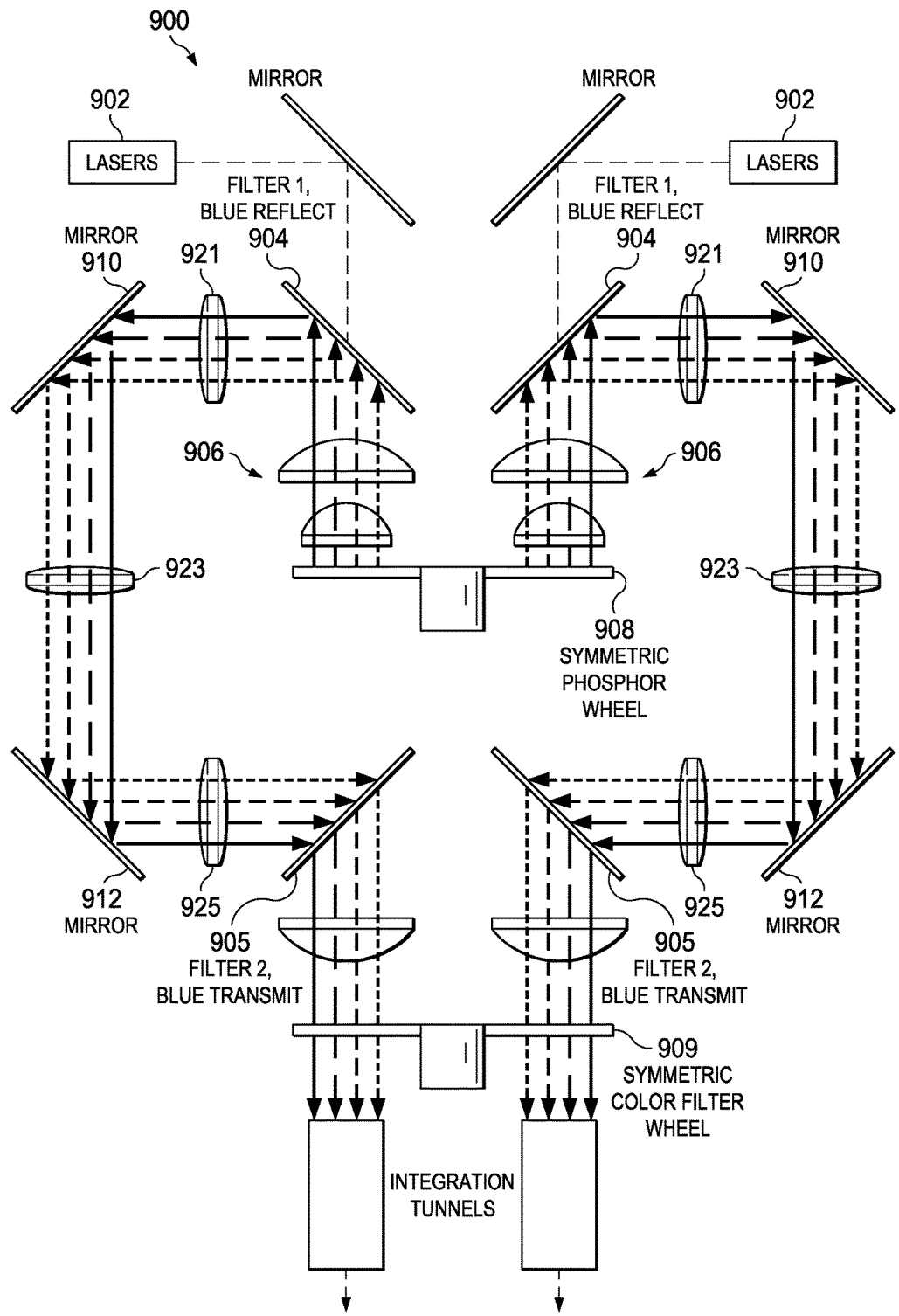

FIG. 9 illustrates such alternative routing, applied in a high brightness illumination system 900 employing tandem color sequence production paths.

In the high brightness illumination system 900 example of FIG. 9, first and second input light beams developed from first and second laser light sources are directed through dichroic filters 904 and optical elements 906 at respective different parts of a phosphor wheel 908 for simultaneous generation of light from each beam according to the characteristics of the phosphor wheel segment on which each beam is incident. For simplicity, the first and second light sources (blue laser light sources) are indicated as different banks of laser diodes 902, each of which generates one of the beams. The two beams may, however, be generated by splitting the illumination emitted by a common laser light source. And, also for ease of illustration, the first and second input beams are shown incident at diagonally opposite locations of a phosphor wheel 908 having identical color sequence pattern generating segments (blue, green, red, yellow color generating segments) spaced 180° apart about a same annular ring (like those illustrated in FIG. 2).

With the illustrated arrangement 900, as the phosphor wheel 908 rotates, the input beam from each laser light source 902 is incident on its respective diagonally opposite segment. When the input laser light (blue) strikes another color producing segment (green, red, or yellow segment), the other color (green, red or yellow) is emitted by the phosphor and transmitted via a beam steering path to a respective corresponding filter segment filtering/diffusion portion of the filter wheel 909. Again, for ease of illustration, the filter wheel 909 is configured with identical filter segment patterns spaced 180° apart (like those illustrated in FIG. 5), symmetrically about the filter wheel 909, so that the filtered/diffused light resulting from each input beam will have the same color point characteristics. When the input laser light (blue) strikes the same color (blue) producing segment, at least a portion is transmitted through an opening in the phosphor wheel 908. (Another portion of the input light may be used for production of phosphor emitted cyan or other color point modifying light which passes along the same path as the other color phosphor emitted light, as previously discussed.) The transmitted portion is then passed to a corresponding segment of the filter wheel 909, for filtering and/or diffusing according to the characteristics of the filter wheel segment. The illumination color sequence generated by each beam is then integrated and passed for use in projection.

In contrast to the arrangement shown in FIG. 8, the reutilized blue input light is passed directly to the filter wheel 909, rather than around a same beam steering path (shown by mirror 910, 912 and lens 921, 923, 925 elements) and as the green, red, yellow and (if applicable) cyan light. Here, the phosphor wheel 908 and filter wheel 909 are sufficiently far apart to enable one or more other optical elements to be inserted therebetween. In this case, a blue transmit 45° angled dichroic filter 905 is used to serve both as a reflective element for the colors transmitted to the filter wheel via the beam steering path, and as a transmitting element for the reutilized blue color transmitted through the phosphor wheel directly toward the filter wheel 909. For the shown arrangement, because the upstream and downstream sets of angled dichroic filters 904, 905 perform same or similar functions regarding which color light to transmit and which color light to reflect, filters 904 and 905 may be chosen which have same or similar characteristics.

The spaced apart wheels 908, 909 shown in FIG. 9 may be sized identically or be given different sizes. The openings in the blue filter segments of the phosphor wheel 908 may be in direct alignment with the corresponding filter/diffuser segments on the filter wheel 909, or routing for the reutilized blue input light may be provided by separate optical steering elements. The light from the two light generating paths exiting the filter wheel 909 may be combined into a single path for commonly illuminating a same spatial light modulator, or the exiting light may be used in separate paths to illuminate different spatial light modulators or different pixel modulating element groupings of a same spatial light modulator.

An implementation of the arrangement in FIG. 9 that combines identical color sequences generated using two laser input light sources and two identical light production channels with symmetric phosphor wheel and filter wheel patterns may be useful to provide a higher (double) intensity illumination system for image projection. Such a system may also be operated in a redundancy mode, using one of the generated color sequences for projection and one for backup.

The system of FIG. 9 may also be configured to generate non-identical sequences using different phosphor wheel segment patterning and/or different filter wheel segment patterning for each channel. The segments of one channel may, for example, be disposed about the wheel in a first annular ring onto which the input light from one channel is incident, and the segments of the other channel may, for example, be disposed about the same wheel in a second annular ring radially spaced from the first annular ring and onto which light from the other channel is incident. The wheels may, for example, be configured to provide a given color sequence as an illumination source for modulation to produce a left-eye image of one polarization or wavelength spectrum from one channel and to provide a color sequence to produce a right-eye image of another polarization or wavelength spectrum. The different characteristics of left- and right-eye images can then be discerned by different characteristics of corresponding left- and right-eye portions of donned eyewear to provide 3D perception.

The system of FIG. 9 may also be implemented using reflective paths (such as previously described) for reutilization of all or part of the input light in generating the blue color instead of, or in combination with transmission through the phosphor wheel, in one or both of the light generating channels.

The same principles may also be applied to more than two light generating channels, configuring the laser sources, phosphor wheel segments, filter wheel segments, etc. to accommodate three or more simultaneous or temporally spaced same or different color sequence illumination paths.

Those skilled in the art to which the invention relates will appreciate that other modifications may be made to the described embodiments, and also that many other embodiments are possible, within the scope of the disclosed invention.

What is claimed is:

1. An illuminator for an image projection system, comprising:
    a source of laser light of a first wavelength;
    a rotatable member including first and second annular bands having different radii; the first band having first and second phosphor segments and a third segment transmitting or reflecting light of the first wavelength, the respective first band segments being angularly spaced about the first band, wherein the first band third segment has an opening for transmitting light of the first wavelength; and the second band having first, second and third filter segments, the respective second band segments being angularly spaced about the second band in correspondence with the angular spacing of the first band segments;
    a dichroic optical element;
    light output optics; and
    light directing optics;
    the first and second phosphor segments configured to emit light of second and third wavelengths when illuminated by light of the first wavelength;
    the dichroic optical element configured to direct the first wavelength light received from the laser light source onto the rotatable member for sequential illumination of the respective first band segments as the rotatable member rotates, to direct light of the second and third wavelengths emitted from the first and second phosphor segments from the rotatable member to the light output optics, and to direct light of the first wavelength transmitted or reflected by the third first band segment to the light output optics; and
    the light directing optics configured to direct light received from the dichroic element to the second band segments of the rotating member; whereby light emitted from the first band first phosphor segment will be directed to the first filter segment, light emitted from the first band second phosphor segment will be directed to the second filter segment, and light transmitted or reflected from the first band third segment will be directed to the third filter segment.

2. The illuminator of claim 1, wherein the rotatable member comprises first and second discs; the first annular band is located on the first disc; and the second annular band is located on the second disc.

3. The illuminator of claim 2, wherein the first and second discs are mounted coaxially for rotation on a common rotatable shaft.

4. The illuminator of claim 3, wherein a radius of the first annular band is less than a corresponding radius of the second annular band.

5. The illuminator of claim 4, further comprising second light directing optics configured to direct light transmitted through the opening, from the opening back to the dichroic optical element.

6. The illuminator of claim 1, wherein the dichroic element is configured to transmit the first wavelength and to reflect the second and third wavelengths.

7. The illuminator of claim 1, wherein a radius of the first annular band is less than a corresponding radius of the second annular band.

8. The illuminator of claim 1, further comprising second light directing optics configured to direct light transmitted through the opening, from the opening back to the dichroic optical element.

9. The illuminator of claim 8, wherein the dichroic element is configured to transmit the first wavelength and to reflect the second and third wavelengths.

* * * * *